Dec. 21, 1954    A. H. DECKER ET AL    2,697,802
CONTROL FOR GASEOUS DISCHARGE DEVICES
Filed Oct. 7, 1953
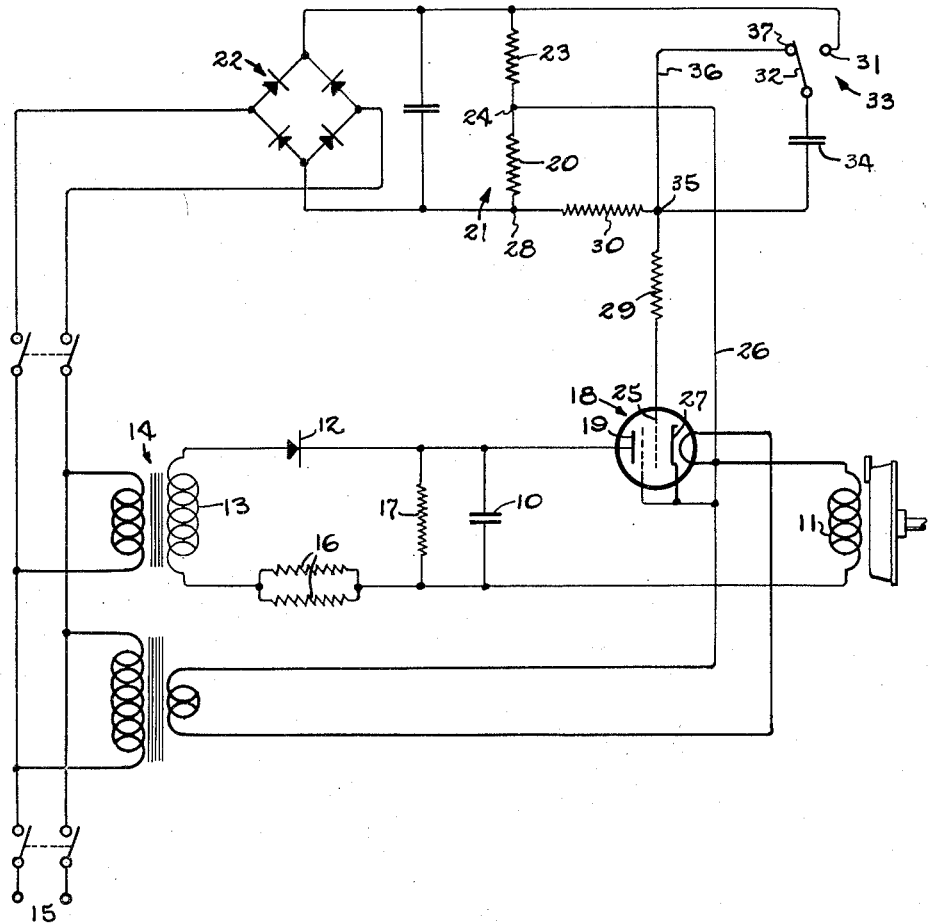
INVENTORS
Andrew H. Decker
Charles W. Modersohn
Ralph R. Palmer
ATTORNEY

United States Patent Office 2,697,802
Patented Dec. 21, 1954

2,697,802

CONTROL FOR GASEOUS DISCHARGE DEVICES

Andrew H. Decker, Charles W. Modersohn, and Ralph Ronald Palmer, Beloit, Wis., assignors to Warner Electric Brake & Clutch Company, South Beloit, Ill., a corporation of Illinois Application October 7, 1953, Serial No. 384,556

3 Claims. (Cl. 315—355)

This invention relates generally to electrical apparatus for controlling conduction or firing of a gaseous discharge device such as a thyratron tube having an anode, a cathode, and a control grid and, more particularly, to circuits for controlling the bias voltage applied between the control grid and the cathode of the tube. The control characteristics of such tubes vary so that some require the application of a positive bias to the control grid before the tubes conduct whereas others conduct in response to a mere removal of negative bias from the control grid.

One object of the invention is to provide novel control apparatus of the above character for firing a thyratron tube only once in response to each actuation of a switch regardless of the polarity of grid bias required to render the tube conductive.

Another object is to provide a novel bias control network including a capacitor and a voltage divider connected to the control elements of the tube in a novel manner to apply a single positive voltage impulse to the control grid in response to actuation of a switch and then to charge the capacitor to apply a cut-off bias to the control grid.

Other objects and advantages of the invention will become apparent from the following detailed description taken in connection with the accompanying drawing which is a schematic wiring diagram of a control embodying the novel features of the present invention.

In the drawing, the invention is shown for purposes of illustration embodied in electrical apparatus for controlling the discharge of a capacitor 10 in which energy of a predetermined amount is stored for delivery at a high voltage, herein 330 volts, to the winding 11 of an electromagnetic brake to effect a rapid change of flux in the magnetic elements of the brake. The charging circuit for the capacitor includes in series therewith a rectifier 12 and the secondary 13 of a transformer 14 of which the primary is connected to a suitable alternating current source 15 and by which the primary voltage is changed to a desired value such as 250 volts. The rate of charging of the capacitor is determined by two parallel resistors 16 of suitable value such as 500 ohms connected in series with the rectifier of the capacitor. As a safety measure, a bleeder resistor 17 of 10,000 ohms may be connected across the capacitor.

To discharge the capacitor 10 through the brake winding 11, the two are connected in series in the load or output circuit of a gaseous discharge device 18 which, in this instance, is a thyratron tube acting as a switch to complete the discharge circuit when the tube is rendered conductive, the positively charged plate of the capacitor being connected to the anode 19 of the tube to provide a positive bias thereon. As is well known in the art, a thyratron tube fires or is rendered conductive when the bias between the cathode and the control grid thereof is of such value, depending on the tube characteristics and the amount of positive bias on the anode, that the gas within the tube ionizes. Once such ionization occurs, the grid is ineffective to control the electron flow within the tube until the latter is extinguished by reduction of the positive bias on the anode to a predetermined value also depending on the control characteristics of the tube.

Some types of thyratron tubes require only that the bias on the control grid be of a low negative value or zero for ionization of the gas whereas other types actually require that the grid of the tube be positive with respect to the cathode before the tube will fire. For example, in the tube 18 which herein is an FG105 tube manufactured by the General Electric Company of Schenectady, New York, a positive grid bias of one half of a volt is recommended to insure firing of the tube when the anode potential is 300 volts. The recommended grid bias for an FG67 tube also manufactured by the General Electric Company is 12 volts positive when the anode potential is 300 volts.

Although some thyratron tubes require a positive grid bias to effect ionization of the gases therein as described above, it is customary in the use of such tubes as well as in the use of those which fire at a low negative or zero value of bias voltage to apply a negative bias to the control grid of sufficient value to insure cut off of the tube when it is desired to render the latter non-conductive. In the present instance, a unidirectional voltage normally biasing the tube 18 to cut off is derived from a resistor 20 which is a part of a voltage divider 21 connected across the output terminals of a full wave rectifier 22 whose input terminals are connected across the alternating current source 15. The divider 21 is completed by a second resistor 23 connected in series with the bias resistor 20 between the positive terminal 24 of the latter and the positive output terminal of the rectifier.

To apply the negative bias to the control grid 25 of the tube, the positive terminal 24 of the bias resistor 20 is connected by a conductor 26 to the tube cathode 27 and the negative terminal 28 of the bias resistor is connected to the control grid through a grid current limiting resistor 29 of suitable value such as 4,700 ohms. For a purpose to appear later, connection of the negative terminal 28 of the bias resistor to the grid resistor 29 is through a series resistor 30. In this instance the unidirectional output voltage of the rectifier 22 is approximately 153 volts and the values of the bias and second voltage divider resistors 20 and 23 are 2,000 ohms and 15,000 ohms so that the voltage drop across the bias resistor is approximately 18 volts.

In certain types of controls such as the one described above for the discharge through an electromagnetic winding of a capacitor connected continuously to its charging source, it is desirable to fire the tube 18 and initiate discharge of the capacitor in response to closure of two contacts 31 and 32 of a switch 33 and to maintain the conductive condition of the tube for only a limited time, for example, that required for release of substantially all of the energy stored in the capacitor 10. To achieve such control with either of the above types of thyratron tubes, novel means is provided to fire the tube 18 in response to closure of the contacts 31 and 32 regardless of the polarity of grid bias required to ionize the gas within the tube and, in addition, to apply a cut-off bias to the grid 25 after such firing to avoid refiring of the tube until after the switch has been opened. In accordance with the invention, this means comprises a normally discharged timing capacitor 34 which, in response to closure of the switch contacts, is connected between the grid 25 and the cathode 27 in series with a source of unidirectional voltage higher than that of the bias source 20 and of a polarity to apply a positive impulse to the control grid. Simultaneously with its connection between the grid and cathode of the tube, the capacitor 32 is connected in a circuit by which it is charged in a direction to restore a cut-off bias between the grid and the cathode.

To simplify the bias control network, the voltage divider 21 is utilized to provide not only the negative bias source 20 but also the source for the positive voltage impulse to be applied to the control grid 25 and a source for charging the timing capacitor 34. This is accomplished by using the second divider resistor 23 as the positive impulse source and connecting the timing capacitor in series with the switch contacts 31 and 32 between the positive terminal of the second divider resistor 23 and the junction 35 between the grid resistor 29 and the series resistor 30. Thus, when the switch contacts are closed after discharge of the timing capacitor, the latter acts momentarily as a short circuit connecting the second divider resistor between the cathode and the control grid to apply a positive impulse to the grid to fire the tube. Stated another way, the capacitor 34 may be considered as completing for an instant a series circuit through the divider 21 and the series resistor 30, the latter acting as a load resistance whose terminal 35 adjacent the grid resistor 29 is positive momentarily to apply the firing impulse to the grid.

The charging circuit for the timing capacitor 34 completed by closure of the switch contacts 31 and 32 is a series circuit including both divider resistors 20 and 23 and the series resistor 30. In addition to acting as a load resistance for applying the positive impulse to the control grid 25, the series resistor 30 also functions to protect the divider by limiting the flow of charging current to the timing capacitor and to determine the rate of such charging. This rate preferably is such that the timing capacitor becomes charged sufficiently that the cut-off voltage is applied to the control grid at the time that the voltage of the energy storage capacitor 10 has dropped to the value at which the tube is extinguished.

While the timing capacitor 34 may be discharged through a bleeder resistor connected continuously across its plates, such discharge is effected in the present instance through a short circuit 36 completed automatically in response to opening of the switch contacts 31 and 32. For this purpose, the switch 33 is preferably a single-pole double-throw type whose movable contact 32 engages the fixed contact 31 in one of its positions to complete circuits through the timing capacitor for firing the tube 18 and restoring the cut-off bias. In its other position, the movable switch contact 32 engages another fixed contact 37 to complete the short circuit 36 for discharging the capacitor 34.

To summarize the operation of the apparatus described above, the tube 18 is biased to cut-off by negative voltage applied to the grid 25 by the bias resistor 20, the energy storage capacitor 10 is charged to its full value, herein 330 volts, and the timing capacitor 34 is discharged when the movable switch contact 32 is in the position shown in the drawing to complete the timing capacitor discharge circuit 36. As soon as the switch contacts 31 and 32 are closed to connect the discharged timing capacitor in series with the second divider resistor 23 between the control grid 25 and the cathode 27, a positive impulse is applied to the grid through its resistor 29 to fire the tube and thereby complete the circuit for discharging the energy storage capacitor 10 through the winding 11. At the same time, a charging circuit for the timing capacitor is completed through the voltage divider 21 and the series resistor 30. By the time that the voltage of the energy storage capacitor 10 has been reduced to the value at which the tube is extinguished, the timing capacitor will have become charged sufficiently that the negative cut-off bias is restored to the control grid 25 so that the tube 18 will be extinguished. Such condition exists until the switch contacts 31 and 32 are opened and closed again to apply another positive impulse to the control grid.

By virtue of the novel manner of connecting the discharged timing capacitor 34 and the voltage divider 21 to the cathode 27 and the control grid 25 of the tube 18, the voltage divider may be utilized to provide not only the negative bias for the tube but also the positive impulse for firing the tube and the charging voltage for the timing capacitor. Because it applies a positive impulse to the control grid in response to actuation of the switch 33, this simple arrangement is adapted for use in controlling both types of thyratron tubes requiring either a positive bias or a low negative bias to render the tube conductive.

We claim as our invention:

1. In a network for controlling conduction by a gaseous discharge device having an anode, a cathode, and a control grid, the combination of, a voltage divider having a negative tap, a positive tap, and an intermediate tap, means connecting said intermediate tap to said cathode and said negative tap to said control grid through a resistor to apply a negative bias to the grid to render said device non-conductive, a capacitor, means including a switch operable when closed to connect said capacitor between said positive tap of said divider and the terminal of said resistor remote from said negative tap, and a circuit through said capacitor operable to discharge the latter when said switch is open whereby, when the switch is closed, the discharged capacitor acts momentarily as a short circuit between said positive tap and said control grid.

2. In a network for controlling conduction by a gaseous discharge device having an anode, a cathode, and a control grid, the combination of, a first source of unidirectional voltage, a second similar source connected at its negative terminal to the positive terminal of said first source and having a voltage higher than that of the first source, means connecting the positive terminal of said first source to said cathode and the negative terminal thereof to one terminal of a resistor having its other terminal connected to said control grid, a normally discharged capacitor, and means including a switch operable when closed to connect said capacitor between the positive terminal of said second source and said other terminal of said resistor.

3. In a control for a gaseous discharge device having an anode, a cathode, and a control grid, the combination of, a source of unidirectional voltage connected between said cathode and said control grid to apply a negative bias to the latter to render said device non-conductive, a normally discharged capacitor, a second bias source having a voltage higher than that of said first source, a first circuit operable when closed to connect said discharged capacitor and said second source in series between said control grid and said cathode to apply a positive impulse of voltage to the grid momentarily to render said device conductive, a second circuit through said capacitor including a resistor and operable when closed to charge the capacitor to restore the negative bias to said grid, and means operable selectively to close said circuits substantially simultaneously.

No references cited.